（12）United States Patent
Lorig et al.

(10) Patent No.: US 10,399,260 B2
(45) Date of Patent: Sep. 3, 2019

(54) METHOD FOR PRODUCING A COMPOSITE SEALING ELEMENT

(71) Applicant: CQLT SAARGUMMI TECHNOLOGIES S.A.R.L., Remich (LU)

(72) Inventors: Michael Lorig, Gaudin (DE); Ralf Bickel, Beckingen (DE); Suleyman Samanci, Wadern-Neukirchen (DE)

(73) Assignee: CQLT SAARGUMMI TECHNOLOGIES S.À.R.L., Remich (LU)

( * ) Notice: Subject to any disclaimer, the term of this patent is extended or adjusted under 35 U.S.C. 154(b) by 298 days.

(21) Appl. No.: 15/539,536

(22) PCT Filed: Dec. 16, 2015

(86) PCT No.: PCT/EP2015/002539
§ 371 (c)(1),
(2) Date: Jun. 23, 2017

(87) PCT Pub. No.: WO2016/112944
PCT Pub. Date: Jul. 21, 2016

(65) Prior Publication Data
US 2017/0355113 A1 Dec. 14, 2017

(30) Foreign Application Priority Data

Jan. 13, 2015 (DE) .......................... 10 2015 100 379

(51) Int. Cl.
B29C 45/14 (2006.01)
B29C 45/00 (2006.01)

(52) U.S. Cl.
CPC ........ B29C 45/14409 (2013.01); *B29C 2045/0063* (2013.01); *B29C 2045/14098* (2013.01); *B29C 2045/14131* (2013.01)

(58) Field of Classification Search
CPC ................. B29C 45/14409; B29C 2045/0063
See application file for complete search history.

(56) References Cited

U.S. PATENT DOCUMENTS

| 4,911,873 A | 3/1990 | Kauzuya et al. |
| 5,407,628 A | 4/1995 | Nozaki et al. |
| 5,505,602 A | 4/1996 | Sumi |

FOREIGN PATENT DOCUMENTS

| AT | 9143 E | 9/1984 |
| DE | 29621997 U1 | 2/1998 |

(Continued)

OTHER PUBLICATIONS

Machine translation of document N.*

*Primary Examiner* — Austin Murata
(74) *Attorney, Agent, or Firm* — Lucas & Mercanti, LLP; Klaus P. Stoffel

(57) ABSTRACT

A method for producing a composite sealing element, in particular for forming a seal at a retractable pane of a vehicle window, wherein the composite sealing element is produced from at least one extruded element portion and at least one element part formed by injection molding in a mold cavity of a mold, with the element part being molded onto an end face, bounding the mold cavity, of the extruded portion. A change in the dimensions of the composite sealing element as a result of the length of the extruded element portion differing from the nominal value is counteracted by changing the arrangement of the end face of the extruded element portion with respect to the mold cavity.

13 Claims, 1 Drawing Sheet

(56) References Cited

FOREIGN PATENT DOCUMENTS

| | | | |
|---|---|---|---|
| DE | 102004019115 B3 | | 1/2006 |
| DE | 102004038467 A1 | | 3/2006 |
| DE | 102014101753 A1 | | 3/2015 |
| JP | S57205128 A | | 12/1982 |
| JP | 2006-88461 | * | 4/2006 |

\* cited by examiner

METHOD FOR PRODUCING A COMPOSITE SEALING ELEMENT

The present application is a 371 of International application PCT/EP2015/002539, filed Dec. 16, 2015, which claims priority of DE 10 2015 100 379.1, filed Jan. 13, 2015, the priority of these applications is hereby claimed and these applications are incorporated herein by reference.

BACKGROUND OF THE INVENTION

The invention relates to a method for producing a composite sealing element, in particular for forming a sealing arrangement for a pane that can be lowered in a vehicle window, wherein the composite sealing element is produced from at least one extruded element section and at least one element part, which is formed by means of an injection-molding procedure in a mold chamber of a molding tool, whilst molding the element part onto an end face of the extruded element section, said end face delimiting the mold chamber.

The length of the element section that is formed by means of a cutting process from a continuously extruded sealing profiled strip is subjected as a result of various influences to relatively large fluctuations that lead to correspondingly large deviations in the desired dimensions in the case of the composite sealing element. A considerable portion of the element sections that are formed by means of the cutting process can therefore not be further processed and are recycled as rejects.

SUMMARY OF THE INVENTION

The object of the invention is to provide a new method for producing sealing composite elements that have a reduced reject quota when prefabricating the extruded element sections.

This object is achieved in accordance with the invention by virtue of the fact that, a change in the dimensions of the composite sealing element as a result of a deviation in the length (L) of the extruded element section from the desired value is counteracted by means of changing the arrangement of the end face of the extruded element section with regard to the mold chamber.

The extruded element sections can be processed in an advantageous manner with relatively large deviations from the desired value whilst avoiding rejects by virtue of the fact that the dimensions of the element parts that are produced by means of an injection molding procedure are changed accordingly so that the dimensions of the composite sealing element lie as a whole in the predetermined tolerance range.

The method in accordance with the invention can be performed in such a manner that the extent to which the extruded element section deviates from the desired value is ascertained in advance and an insertion length (L") of the extruded element section in the molding tool is determined with reference to the desired value deviation. The end face is then inserted depending in each case on the desired value deviation of the length of the extruded element section further or to a lesser extent into the molding tool than it corresponds to the desired value of the injection molded element.

In an expedient manner, a detector device detects that the insertion length (L") has been achieved, wherein said detector device detects a marking, in particular a scale, which is applied at a defined spacing with respect to the end face on the extruded element section.

The extruded element section can be inserted into the molding tool with the aid of a movement device that comprises for example transport rollers or a robotic arm.

It is preferred that the movement device is controlled automatically by means of a control unit that comprises preferably a computer and processes the ascertained desired value deviation, wherein the control unit processes in particular the signal from the detector device. The control unit can thus stop the forward movement of the element section automatically in the desired position if the signal that is supplied by the detector device matches a forward movement signal that is determined by the control unit. As an alternative, a length of forward movement, for example of a robotic arm, which engages at a defined spacing with respect to the end face on the extruded element section, could be pre-set with reference to the desired value deviation.

In an expedient manner, the control unit uses the ascertained desired value deviation to calculate the comparison signal that is decisive for the insertion length (L").

Whereas the desired value deviation can be input manually into the control unit, in a further preferred embodiment of the invention the control unit receives a signal from a reader device that detects a sequence of markings at the extruded element section, said sequence of markings being decisive for the desired value deviation, preferably a bar code that is applied at this point after the desired value deviation has been determined.

In a further embodiment of the invention, it is possible to mold on at both ends of the extruded element section an element part that is produced by means of an injection molding procedure, wherein the desired value deviation of the extruded element section can be compensated for by means of desired value deviations of two injection-molded element parts.

It is preferred that a compensation procedure is performed in such a manner that the smallest possible deviations from the desired dimension are achieved for the two injection-molded element parts.

The invention is further explained hereinunder with reference to an exemplary embodiment and the attached drawings that relate to this exemplary embodiment. In the drawings:

DETAILED DESCRIPTION OF THE INVENTION

Figure 1:
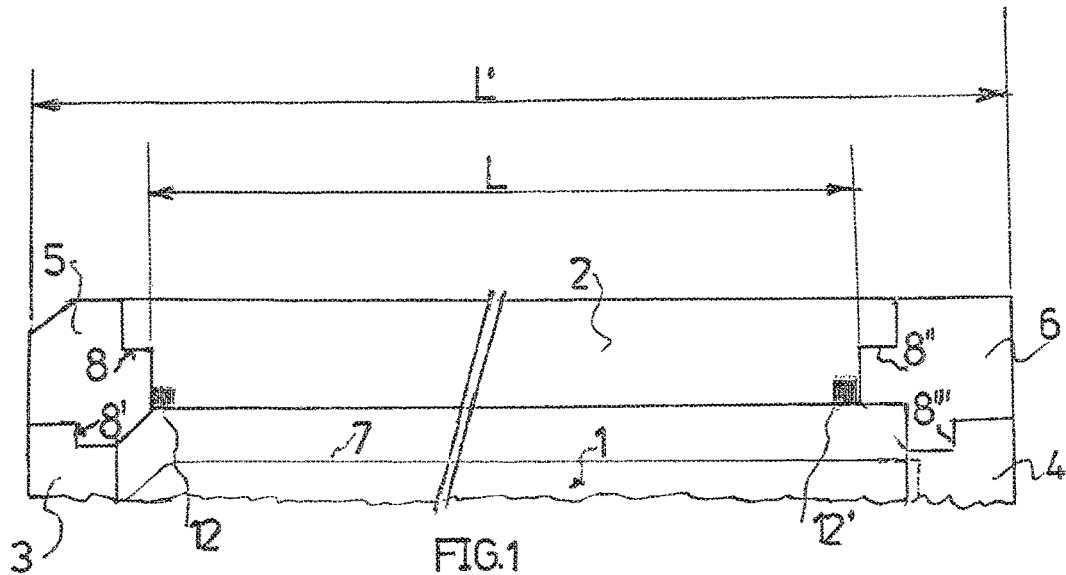
FIG. 1 illustrates a composite sealing element that is produced according to the method in accordance with the invention.

A composite sealing element illustrated schematically in a sectional view in FIG. 1 for forming a sealing arrangement for example on a window pane 1 that can be lowered in a vehicle door (not illustrated) comprises element sections 2,3, and 4 which comprise a sealing profile and are produced by means of an extrusion procedure, and also element parts 5 and 6 that are produced by means of an injection-molding procedure. In the illustrated example, the element sections 2,3 and 4 are embodied from EPDM, the elements 5 and 6 are embodied from a thermoplastic elastomer (TPE). It goes without saying that pairs of materials that differ therefrom are possible, for example EPDM/EPDM and TPE/TPE, or pairs of materials comprising a thermoplastic.

The window pane 1 engages with its edge in guides in the composite sealing element. FIG. 1 illustrates the window pane 1 in the slightly lowered state so that its upper edge 7 is visible.

Figure 2:
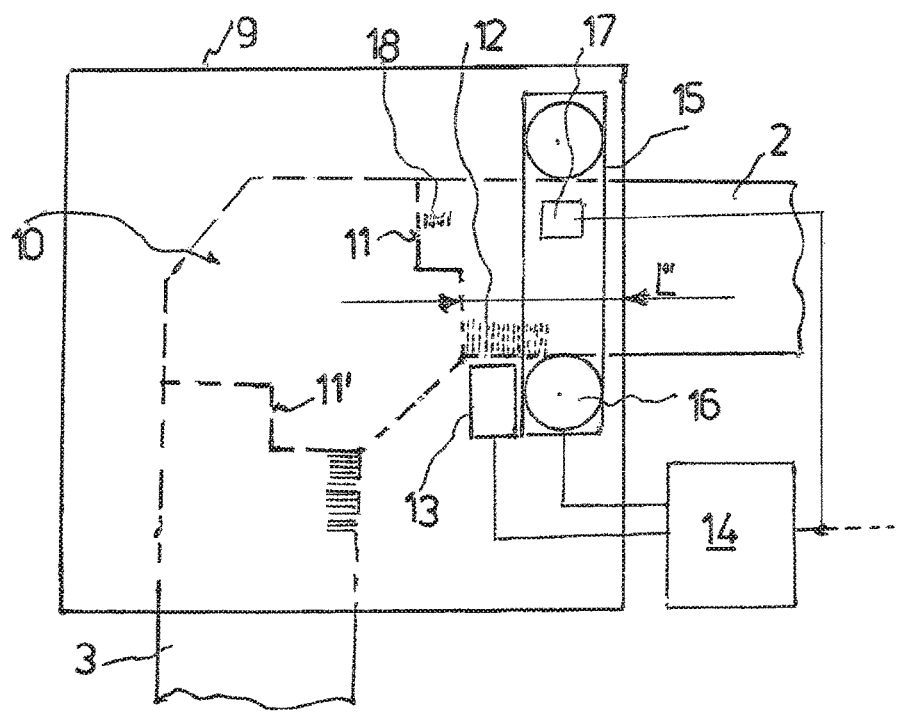
FIG. 2 illustrates a view explaining the production of the composite element shown in FIG. 1.

The element parts 5,6 that are formed by means of an injection-molding procedure are molded in each case onto an end of the extruded element sections 2,3 and 4 in the case of 8,8',8'' and 8'''. FIG. 2 illustrates schematically as an example a molding tool 9 that is used to produce the element part 5 and comprises a mold chamber 10. At the mold chamber 10, end faces 11,11' adjoin ends of the element sections 2 and 3 that are inserted into the molding tool 9.

As the element section 2 is inserted into the molding tool 9, the detector device 13 detects for example in an optical manner a scale 12 that is applied to the extruded element section 2. The detector device 13 supplies measurement signals to a control unit 14 that controls a movement device 15 that comprises transport rollers 16. A corresponding scale, detector device and movement device could also be provided on the molding tool 9 for the extruded element section 3. The detector device and scale could also be located outside the molding tool.

The extruded element sections 2 to 4 of the composite sealing element illustrated in FIG. 1 are produced in each case by means of a cutting process from a continuously extruded strip, wherein the length L, for example of the produced element section 2, is subjected to relatively large fluctuations as a result of different influences. In the case of a small tolerance range for the entire length L' of the composite sealing element and constant dimensions of the element parts 5, 6, there is then a greater proportion of rejects in the case of element sections that are produced by means of a cutting process.

Such a high proportion of rejects can be avoided if, for example, the extruded element section 2 is inserted correspondingly far or to a lesser extent into the molding tool 9 in each case whilst compensating for a previously ascertained deviation of its length L from the desired value.

The respective ascertained desired value deviation of the length L is input, for example manually, into the control unit 14 so as to control the insertion length L". The control unit 14 calculates from this the respective insertion length L". Since the scale 12 is located at a defined spacing with respect to the end face 11 of the element section 2, said scale can determine a scale value that corresponds to this insertion length L" and is to be ascertained by the detector device 13. The movement device 15 pushes the end section of the element section 2 forwards until the calculated scale value is achieved, wherein the scale 12 assumes a predetermined position that corresponds to this scale value with regard to the detector device 13.

In addition to the calculated insertion length L", it is possible from the ascertained desired value deviation to also calculate a control signal for the injecting device, in particular a metering signal.

It goes without saying that furthermore element parts 6 that are to be produced by means of an injection-molding procedure are produced and connected in an identical manner as described above. It is possible to compensate for the desired value deviation in the length L in such a manner that the respective control unit 14 calculates the depth of the insertion in such a manner that the element part 5 or 6 that is produced by means of an injection-molding procedure is as close as possible to its desired dimensions.

As is further evident in FIG. 2, the desired value deviation could also be input into the control unit 14 automatically by way of a reader device 17 that detects a bar code 18 that contains the desired value deviation, said bar code being applied to the element section 2 after measuring the element section 2 that is produced by means of a cutting process.

It goes without saying that the control unit 14 could also be used for controlling a tool for producing the element part 6. The central control unit 14 could also be used for controlling the insertion length L" of the element sections 3 and 4 into the relevant molding tools.

Moreover, it goes without saying that the bar code 12 after producing the element sections 3 to 4 is to be applied at a defined spacing with respect to the end faces 11, 11' by means of a cutting process. As an alternative, a bar code could extend over the entire length of the continuously extruded strip from which the element sections are cut, wherein fluctuations in the distance between the first scale bar and the end face 11 of the element section could be accepted in the case of a small spacing between the scale bars.

The invention claimed is:

1. A method for producing a composite sealing element, in particular for forming a sealing arrangement for a pane that can be lowered in a vehicle window, the method comprising the steps of: producing the composite sealing element from at least one extruded element section and at least one element part that is formed by injection-molding in a mold chamber of a molding tool, wherein during molding of the element part onto an end face of the extruded element section, said end face delimits the mold chamber; and, counteracting a change in dimensions of the composite sealing element as a result of a deviation in a length of the extruded element section from a desired value by changing an arrangement of the end face of the extruded element section with regard to the mold chamber.

2. The method according to claim 1, including ascertaining the desired value deviation of the extruded element section and determining an insertion length of the extruded element section into the molding tool with reference to the desired value deviation.

3. The method according to claim 2, wherein a detector device detects that the insertion length has been achieved, wherein said detector device detects a marking applied at a defined spacing with respect to the end face on the extruded element section.

4. The method according to claim 3, wherein the marking is a scale.

5. The method according to claim 3, including inserting the extruded element section into the molding tool using a movement device.

6. The method according to claim 5, including controlling the movement device by a control unit that processes the ascertained desired value deviation.

7. The method according to claim 6, wherein the control unit also processes a signal from the detector device.

8. The method according to claim 7, wherein the control unit uses the ascertained desired value deviation to calculate a signal that is decisive for the insertion length.

9. The method according to claim 6, wherein the control unit additionally receives a signal from a reader device that detects a sequence of markings that which is applied to the extruded element section and is decisive for the desired value deviation.

10. The method according to claim 9, wherein the sequence of markings is a barcode.

11. The method according to claim 1, including molding an element part, that is produced by an injection-molding procedure onto both ends of the extruded element section.

12. The method according to claim 11, including compensating for the desired value deviation of the extruded element section by desired value deviations of two injection-molded element parts.

13. The method according to claim 12, including performing a compensation procedure so that the desired value deviation of the two element parts is in each case minimal.

\* \* \* \* \*